252-105

United States Patent Office 3,351,655
Patented Nov. 7, 1967

3,351,655
PROCESS FOR PREPARING ODORLESS ALKYL-ARYL SULFONATES AND THE COMPOSITIONS PRODUCED THEREBY
Wolfgang K. Seifert, Fairfax, Calif., assignor to Chevron Research Company, a corporation of Delaware
No Drawing. Filed Aug. 27, 1964, Ser. No. 392,613
10 Claims. (Cl. 260—505)

ABSTRACT OF THE DISCLOSURE

A new process for the preparation of novel odorless alkylaryl sulfonate detergent compositions comprises contacting the sulfonates with a small amount of a hydroxylamine salt. Alkylaryl hydrocarbons containing 9 to 18 carbon atoms in the alkyl radical are sulfonated with concentrated sulfuric acid to their respective alkylaryl sulfonic acids. Separation of the excess sulfuric acid is accomplished before or after neutralization with a suitable base, such as sodium hydroxide. A hydroxylamine salt, preferably hydroxylamine hydrochloride, in an amount of about 0.004 to 2% by weight of the sulfonic acid values of the mixture is intimately contacted with a substantially sulfuric acid-free sulfonate at a pH of 2 to 10 from about ½ to 60 hours at approximately room temperature. Dissolving the hydroxylamine salt in a suitable solvent, preferably ethyl alcohol, enhances its effectiveness.

---

This invention relates to a process for producing odorless alkylaryl sulfonate detergents and to odorless alkylaryl sulfonate detergent compositions prepared in accordance therewith.

In the preparation of alkylaryl sulfonate detergents of the type herein contemplated, alkylaryl hydrocarbon containing 9 to 18 carbon atoms in the alkyl groups are sulfonated with concentrated sulfuric acid to produce a mixture comprising alkylaryl sulfonic acids and unreacted sulfuric acid. The mixture is digested and then as such ("whole acid") is neutralized. Often in practice the mixture after digestion is settled or otherwise treated to effect a separation of an alkylaryl sulfonic acid phase from an aqueous sulfuric acid phase. To aid settling there is often added sufficient water to reduce the sulfuric acid strength, e. g., to 78-80%. The sulfonic acid phase is then neutralized as before with a base to give the salt of the sulfonic acid, and inorganic sulfate due to the presence of sulfuric acid. As bases there may be mentioned sodium hydroxide, potassium hydroxide, ammonium hydroxide, and magnesium hydroxide.

As is known in the art, the sulfonation process can be continuous or batch or a combination thereof.

It is known that in the manufacture of alkylaryl sulfonates as thus described the sulfonation and neutralization steps give rise to a product possessing a characteristic undesirable odor. It has accordingly been proposed to solve the odor problem by a treatment involving the use of a quinone or an aromatic amine, as shown in U.S. Patents 2,831,021 and 2,757,195, respectively.

Also known is the fact that upon storage alkylaryl sulfonates develop a rancid odor which according to the prior art is overcome by various means, as shown, for example, in U.S. Patents Nos. 2,469,378; 2,397,133; and 2,469,376.

In accordance with the present invention, it is proposed to overcome the undesirable odor due to rancidity and that resulting from the sulfonation and neutralization steps by incorporating in the sulfonic acid after its separation from the aqueous sulfuric acid a small but effective amount of hydroxylamine, conveniently added in the form of the salt, such as the hydrochloride, sulfate, or nitrate.

Since the presence of concentrated sulfuric acid destroys the electiveness of the hydroxylamine salt, care is taken that the salt is added to the partially or completely neutralized acid slurry. Removal of sulfuric acid can be accomplished by neutralizing the sulfonic acid phase to a pH in the range from about 2, preferably 6, to 10.

The incorporation of the hydroxylamine can be effected in a number of ways. The sulfonic acid phase can be neutralized to a pH just about 2, whereupon the hydroxylamine salt may be added along with additional neutralizing base or as a separate charge, as the neutralization is continued to the desired extent. On the other hand, neutralization can first be effected to the desired pH, say, at pH 7–8, after which the hydroxylamine salt can then be added. In some instances sufficient base can be added to the sulfonic acid to produce a mixture having a pH of 10, after which the hydroxylamine salt is added and the pH adjusted to the desired level. In any event, an effective amount of hydroxylamine salt will be in about the range 0.004 to 2% by weight based on sulfonic acid values or detergent-active component in the mixture.

Good results are obtained if the hydroxylamine salt is allowed to contact the sulfonic acid phase at room temperature (about 80° F.) for a period of time sufficient to remove odor, generally about ½ hour to 60 hours. Odor removal is expedited by effecting intimate contact, as by stirring, and by the use of somewhat elevated temperatures, for example, up to about 120° F.

The effectiveness of the hydroxylamine can also be enhanced by the use of a solvent for it, such as ethyl alcohol. This feature is particularly useful in the preparation of liquid detergents.

In a more specific embodiment of the invention, there is incorporated in the sulfonic acid-hydroxylamine mixture a second additive. This second additive is a dienophile, that is, a material capable of undergoing a Diels-Alder reaction with conjugated dienes. An example of such reagent is ethyl azodicarboxylate. An amount of this material ranging from about 0.04 to 2% by weight based on alkylaryl sulfonate detergent is cited as satisfactory. Reaction proceeds satisfactorily at room temperature, i.e., about 80° F.

The following examples illustrate the practice of the invention.

Example 1

(a) Polypropylene benzene sulfonic acids, in which the polypropylene alkyl groups averaged 13 carbon atoms, were obtained in a conventional manner. That is, the corresponding polypropylene benzene hydrocarbon was continuously sulfonated with 20% fuming sulfuric acid, the weight ratio of the sulfuric acid to the polypropylene benzene hydrocarbon being 1.15. Temperature of sulfonation was 120° F. Following sulfonation, the reaction mixture was digested for 12 minutes at 120° F.

The whole sulfonation mixture comprising alkylbenzene sulfonic acids and sulfuric acid was neutralized to a pH 7 with sodium hydroxide solution to give a slurry or dispersion in water containing 17% by weight of alkylbenzene sulfonate and 15% by weight of inorganic sodium sulfate. The slurry had the typical undesirable sludge odor.

(b) Two 100 g. samples of the slurry of (a) were treated as follows: To one of the samples there was added 140 mg. of hydroxylamine hydrochloride. The resulting mixture was stirred for one hour at room temperature (80° F.). At the end of the treatment the mixture was neutralized to pH 7. It then was substantially odorless.

The other 100 g. sample of slurry was used as a blank; that is, the sample was stirred at room temperature for 1 hour in the absence of any added additive. The sample retained the characteristic bad odor of the slurry.

*Example 2*

To 100 g. of a slurry sample (Example 1(a)) was added 1 ml. of a solution made up of 0.69 gram $NH_2OH \cdot HCl$ in 100 ml. of 95% ethanol. The resulting mixture was stirred for 1 hour at room temperature. The odor improvement was decidedly superior to that of Example 1.

As a blank, 100 g. of the same slurry was treated with 1 ml. of 95% ethanol without additive. No improvement was noted.

*Example 3*

(a) 100 g. of slurry (Example 1(a)) was adjusted to a pH 6 by adding 0.5 N $H_2SO_4$. There was then added 1 ml. of an alcoholic solution of hydroxylamine hydrochloride (0.069 g. per 100 ml. of 95% ethanol).

(b) As a blank, to another 100 g. sample there was added 1 ml. of ethanol without the hydroxylamine salt.

Each sample was stirred at 80° F. for ½ hour, after which the pH was adjusted to 7 by adding a 0.1 N caustic solution. The odor of sample (a) was significantly improved, whereas that of sample (b) remained unaffected.

*Example 4*

Alkylbenzene having an average molecular weight of 265 was batch sulfonated at a temperature of 45–60° F. with 22% oleum, the weight ratio of oleum to alkylbenzene being 1.11. The sulfonation mixture was digested at 120° F. for 1 hour. Enough water was added to the mixture to dilute the sulfuric acid strength to 78–80% and the mixture then was allowed to settle for 1 hour at 150° F. The alkylbenzene sulfonic acid layer was neutralized with sodium hydroxide solution to a pH of 8. The surface-active content of the resulting slurry was 40% by weight.

(a) 80 g. of this slurry was diluted with 120 g. of water. There was then added 1 ml. of 95% ethanol and 1 ml. of an alcoholic solution of hydroxylamine hydrochloride (0.069 g. per 100 ml. of 95% ethanol).

(b) Another sample was prepared in the same way by adding 2 ml. of ethanol but without hydroxylamine.

The solutions were briefly stirred at 80° F. and then allowed to stand for ½ hour. At the end of this time the odors were compared and sample (a) was found to have a significantly better odor than (b).

*Example 5*

Alkylbenzene of the type of Example 4 was continuously sulfonated with 20% oleum in a weight ratio of oleum to alkylbenzene of 1.15 at a temperature of 120° F. The resulting sulfonation mixture was digested for 12 minutes at 120° F., after which water was added to settle the mixture. The mixture was settled for 20 minutes at 130° F. to separate an alkylbenzene sulfonic acid layer and a sulfuric acid layer. The sulfonic acid layer was neutralized with sodium hydroxide solution to produce a slurry containing 40% surface-active material, and having a pH of 7.

(a) To a sample of 100 g. of the above liquid detergent there was added 0.5 ml. of an alcoholic solution of hydroxylamine hydrochloride (0.69 g. per 100 ml. of 95% ethanol).

(b) To a second sample 100 g. of the above liquid detergent there was added sufficient sulfuric acid to give a pH of 6, whereupon 0.1 ml. of the same alcoholic solution of hydroxylamine hydrochloride was added.

(c) To a third sample of 100 g. of the above liquid detergent there was added sufficient caustic to give a pH of 10, after which there was added 0.1 ml. of the same alcoholic solution of hydroxylamine hydrochloride.

The 3 samples were each stirred briefly and then allowed to stand for 18 hours. At the end of this time, samples (b) and (c) were neutralized to a pH of 7. Odor tests showed that all samples had a significant decrease in odor, sample (c) retaining a not unpleasant vanilla-type odor.

*Example 6*

A polypropylene alkylbenzene having an average molecular weight of 254 was continuously sulfonated with 20% oleum, the weight ratio of the oleum to the alkylbenzene being 1.13, and the sulfonation temperature, 110° F. The sulfonation mixture was digested for 20 minutes at 110° F. To the resulting mixture there was added water to reduce the sulfuric acid strength to 78–80%. The diluted mixture was settled for 20 minutes at 130° F. The sulfonic acid layer was neutralized with aqueous ammonia to a pH of 6.5. Ethanol was added to give a final liquid detergent containing 40% surface-active material in a 16% alcohol solution in water.

To 100 g. of this liquid detergent there was added 0.1 ml. of an alcoholic hydroxylamine hydrochloride solution (0.69 gram per 100 ml. of 95% ethanol). After stirring briefly, the solution was allowed to stand at 80° F. for 2 hours. At the end of this time there was a significant improvement in odor.

*Example 7*

Straight-chain alkylbenzene, prepared from a mixture of n-paraffins having from 11 to 14 carbon atoms, was sulfonated, neutralized, and dried. The dried material was maintained in air at 160° F. for 1 week in order to develop a strong, rancid odor. At the end of this time a liquid detergent was formulated from this dried material, 95% ethanol and water. The final analysis was 14.5% surface-active compounds in a 15% alcohol solution in water. The pH was adjusted to 10 by the addition of a small amount of caustic. To 100 g. of this liquid detergent there was added 4 ml. of an alcoholic solution of hydroxylamine hydrochloride (0.69 g. per 100 ml. of 95% ethanol). The solution was stirred briefly and allowed to stand at 80° F. for 1 hour. At the end of this time the pH was adjusted to 7 by adding a small amount of sulfuric acid. A very significant improvement in odor was noted.

*Example 8*

10 g. of the product of Example 5(c) was mixed with 0.06 ml. of ethyl azodicarboxylate, and allowed to stand for 24 hours. At the end of this time, the slurry was completely odorless.

Another 10 g. sample was mixed with 0.006 ml. of ethyl azodicarboxylate and allowed to stand for 60 hours. At the end of this time substantially no odor was detectable.

I claim:

1. In a process for producing alkylaryl sulfonate by sulfonating an alkylaryl hydrocarbon having 9 to 18 carbon atoms in the alkyl groups with concentrated sulfuric acid to produce a mixture comprising alkylaryl sulfonic acids, and neutralizing said sulfonic acid mixture, the improvement of producing a substantially odorless neutralized alkylaryl sulfonate detergent product which comprises incorporating into the sulfonic acid phase free of sulfuric acid a hydroxylamine salt in an amount of about .004 to 2% by weight based on the detergent active component therein.

2. Process according to claim 1 wherein the hydroxylamine salt is hydroxylamine hydrochloride.

3. Process according to claim 2 wherein the hydroxylamine hydrochloride is incorporated in the sulfonic acid phase at a pH of 6 to 10.

4. Process according to claim 3 wherein the alkylaryl hydrocarbon is an alkylbenzene and the hydroxylamine hydrochloride is incorporated in the sulfonic acid phase in the presence of a solvent therefor.

5. Process of producing an odorless alkylaryl sulfonate detergent which comprises sulfonating an alkylaryl hydrocarbon having 9 to 18 carbon atoms in the alkyl groups with concentrated sulfuric acid to produce a reaction product mixture comprising alkylaryl sulfonic acids and unreacted sulfuric acid, separating said reaction product mixture to separate an alkylaryl sulfonic acid phase and a sulfuric acid phase, neutralizing the said alkylaryl sulfonic acid phase to a pH in the range 2 to 10, adding to the neutralized phase 0.004 to 2% by weight based on the sulfonic acid values contained therein, of hydroxylamine salt and heating the resulting mixture to a temperature up to 120° F. for a period of time sufficient to remove undesirable odor.

6. Process according to claim 5 wherein the hydroxylamine salt is hydroxylamine hydrochloride and is added in the presence of a solvent therefor.

7. Process according to claim 5 wherein the alkylaryl sulfonic acid phase is neutralized to a pH in the range 6 to 10.

8. Process according to claim 5 wherein in addition to the hydroxylamine salt there is added ethyl azodicarboxylate in an amount of about 0.04 to 2% by weight based on sulfonate detergent.

9. An odorless neutralized alkylaryl sulfonate detergent composition having 9 to 18 carbon atoms in the alkyl groups having incorporated therein hydroxylamine in an amount of about 0.004 to 2% by weight based on the sulfonate detergent.

10. Composition according to claim 9 containing in addition ethyl azodicarboxylate in an amount of about 0.04 to 2% by weight based on sulfonate detergent.

References Cited

UNITED STATES PATENTS

Re. 22,548  9/1944  Brandt _____ 260—505
2,469,378  5/1949  Flett _____ 260—505

OTHER REFERENCES

Gilman. Organic Chemistry, volume 1 (1938), pages 675–9.

LORRAINE A. WEINBERGER, *Primary Examiner.*

M. WEBSTER, *Assistant Examiner.*